US007996454B2

(12) United States Patent
Ebert et al.

(10) Patent No.: US 7,996,454 B2
(45) Date of Patent: Aug. 9, 2011

(54) METHOD AND APPARATUS FOR PERFORMING COMPLEX CALCULATIONS IN A MULTIPROCESSOR ARRAY

(75) Inventors: Paul Michael Ebert, Lansdowne, VA (US); Leslie O. Snively, Castle Rock, CO (US); Chiakeng (Jack) Wu, Centennial, CO (US)

(73) Assignee: VNS Portfolio LLC, Cupertino, CA (US)

( * ) Notice: Subject to any disclaimer, the term of this patent is extended or adjusted under 35 U.S.C. 154(b) by 935 days.

(21) Appl. No.: 11/985,870

(22) Filed: Nov. 16, 2007

(65) Prior Publication Data

US 2009/0132794 A1   May 21, 2009

(51) Int. Cl.
*G06F 15/00* (2006.01)
(52) U.S. Cl. .................................................... 708/404
(58) Field of Classification Search ........... 708/400–410
See application file for complete search history.

(56) References Cited

U.S. PATENT DOCUMENTS

| 5,968,109 A | * | 10/1999 | Israni et al. | 701/208 |
| 6,567,858 B1 | * | 5/2003 | Yang et al. | 712/11 |
| 2008/0148009 A1 | * | 6/2008 | Doerr et al. | 712/11 |

* cited by examiner

*Primary Examiner* — Tan V Mai
(74) *Attorney, Agent, or Firm* — Henneman & Associates, PLC; Larry E. Henneman, Jr.

(57) ABSTRACT

A method and apparatus for performing complex mathematical calculations. The apparatus includes a multicore processor 10 where the cores 15 are connected 20 into a net with the processors on the periphery 15a primarily dedicated to input/output functions and distribution of tasks to the central processors 15b-h of the net. The central processors 15b-h perform calculations substantially simultaneously, far exceeding the speed of conventional processors. The method 100, which may be implemented by an instruction set to the processor nodes, informs the processor nodes how to divide the work and conduct the calculations. The method includes steps dividing the data into subsets 110 directing the subsets to predetermined nodes 115, performing the calculations 120 and outputting the results 125.

21 Claims, 3 Drawing Sheets

METHOD AND APPARATUS FOR PERFORMING COMPLEX CALCULATIONS IN A MULTIPROCESSOR ARRAY

FIELD OF INVENTION

The present invention relates to the field of computers and computer processors, and more particularly to a method for parallel processing utilizing a combination of multiple computers on a single microchip, wherein operating efficiency is important because of the desire for increased operating speed. With greater particularity the invention relates to strategies for distribution of calculation tasks to individual processors in the array.

DESCRIPTION OF THE BACKGROUND ART

It is useful in many information processing applications of computers to use multiple processors or multiple computers to speed up operations. Dividing a task and performing multiple processing and computing operations in parallel at the same time is known in the art, as are many systems and structures to accomplish this. An example is systolic array processing wherein a large information stream is divided up among rows of processors that perform sequential computations by column, and pass results to the next column. Other examples are found in the field of supercomputing, wherein multiple processors may be interconnected and tasks assigned to them in a number of different ways, and communication of intermediate results between processors and new data and instructions to them may be provided through crossbar switches, bus interconnection networks with or without routers, or direct interconnections between processors with message passing protocols such as MPICH, used on large machines.

Digital Signal Processing (DSP) is a pervasive technology, which is computationally burdened with Fast Fourier Transform (FFT) calculations, known as butterfly computations (also referred to as "butterflies"). The butterfly processing time has been and continues to be a major challenge to product advancements in applications such as wireless communications, due to the ever increasing speed and processing complexity requirements. Although prior art multiple processor architectures have improved the FFT processing speeds, those architectures have reached limitations to making further improvements because of physical constraints that limit the speed of exchanging information between computers. A novel approach to improve the butterfly computational speed is needed to take advantage of the new multiprocessor array architectures mentioned above. While the invention is described using a butterfly calculation, the invention is equally applicable to other complex calculations.

SUMMARY OF INVENTION

Owing to continual progress in semiconductor technology, more and faster circuits can be placed on a microchip. Single chip multiple processor arrays and multicore processors that provide new capabilities and optimizations as embedded systems in consumer and industrial electronic products, by doing computations enormously faster, are examples of improvements which have yielded great economic benefit.

In the past, methods for maximizing the speed of computations have been constrained to von Neumann machine architectures with an external memory holding all program instructions, as known in the art. New architectures are now overcoming those limitations wherein the multiprocessor array is adapted to operate as a plurality of von Neumann machines with local memories which hold substantially the major part of its program instructions, including the operating system. Clearly, further improvement in performance, utilizing more efficient computational methods applied to these new multiple processor architectures, especially on a single microchip, is highly desirable.

The present invention is a fast multicore method to process a complete FFT computation utilizing multiple core processors with local memory, thus avoiding the timing overhead associated with accessing common resources, such as external memory and a single operating system, in usual practice. With this method, all data and control information is exchanged between the physically closest processor cores, to minimize communication delay time, as distinguished from known art where the physical placement of the processing units (also referred to as CPUs) to each other is less relevant, because control and data flows to and from external memory located separately from the CPUs.

DETAILED DESCRIPTION OF THE DRAWINGS

Figure 1:
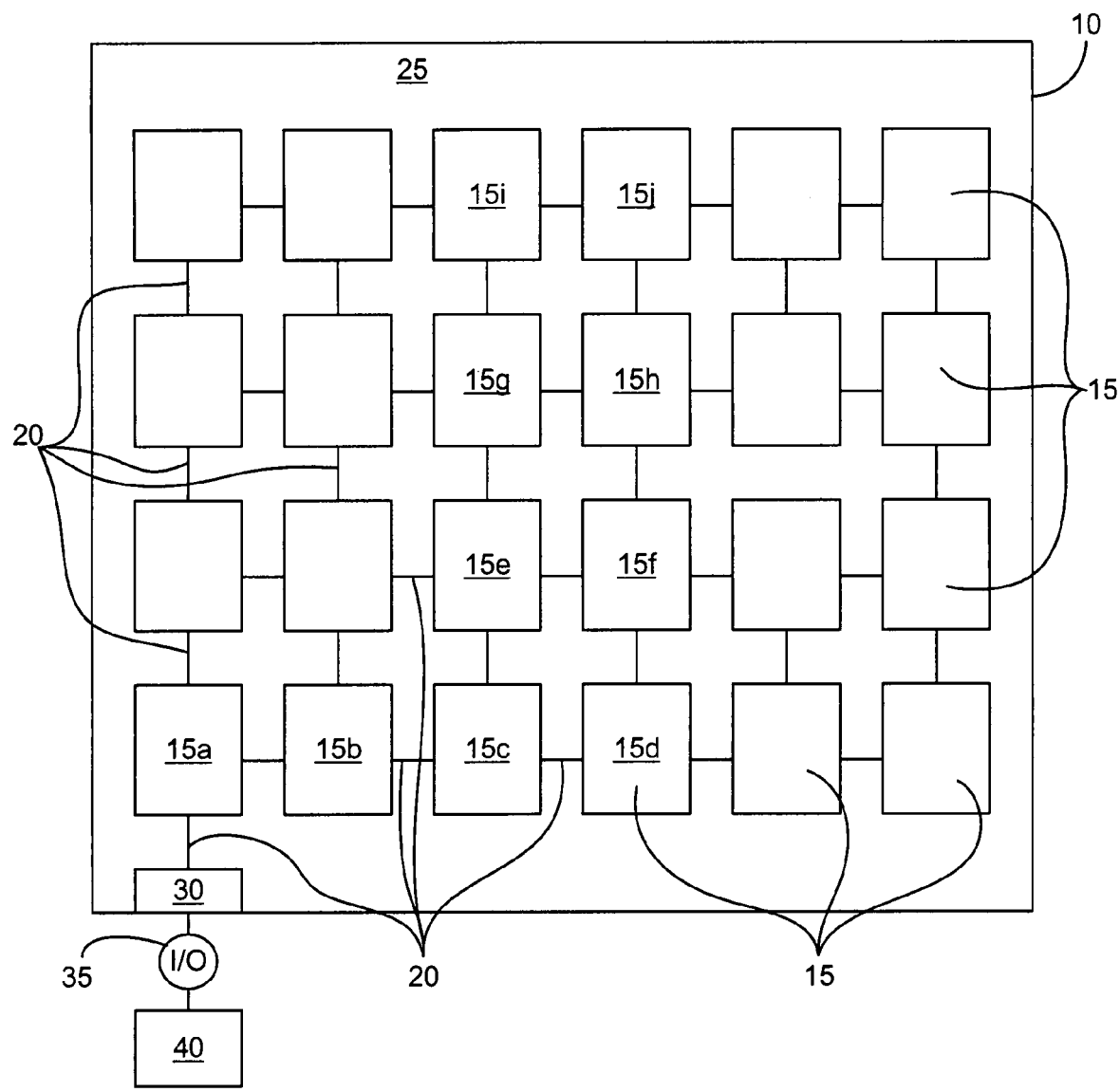
FIG. 1 is a block diagram of a computer array used in an embodiment of the invention.

The multiple core processor array (computer array) used in the method of the invention is depicted in a diagrammatic view in FIG. 1 and is designated therein by the general reference character 10. The computer array 10 has a plurality (twenty-four in the example shown) of computers 15 (sometimes also referred to as "processors", "cores" or "nodes"). In the example shown, all the computers 15 are located on a single die (also referred to as "chip") 25. Each of the computers 15 is a general purpose, independently functioning computer and is directly connected to its physically closest neighboring computers by a plurality of single drop data and control buses 20. In addition, each of the computers 15 has its own local memories (for example, ROM and RAM) which hold substantially the major part of its program instructions, including the operating system. Nodes at the periphery of the array (in the example shown, node 15a), can be directly connected to chip input-output (I/O) ports 30. External I/O connections 35 to the chip I/O ports 30 are for the general purpose of communicating with external devices 40. An example of a multiple computer array described above is the SEAforth™ C18 twenty-four node single chip array made by IntellaSys™.

Figure 2:
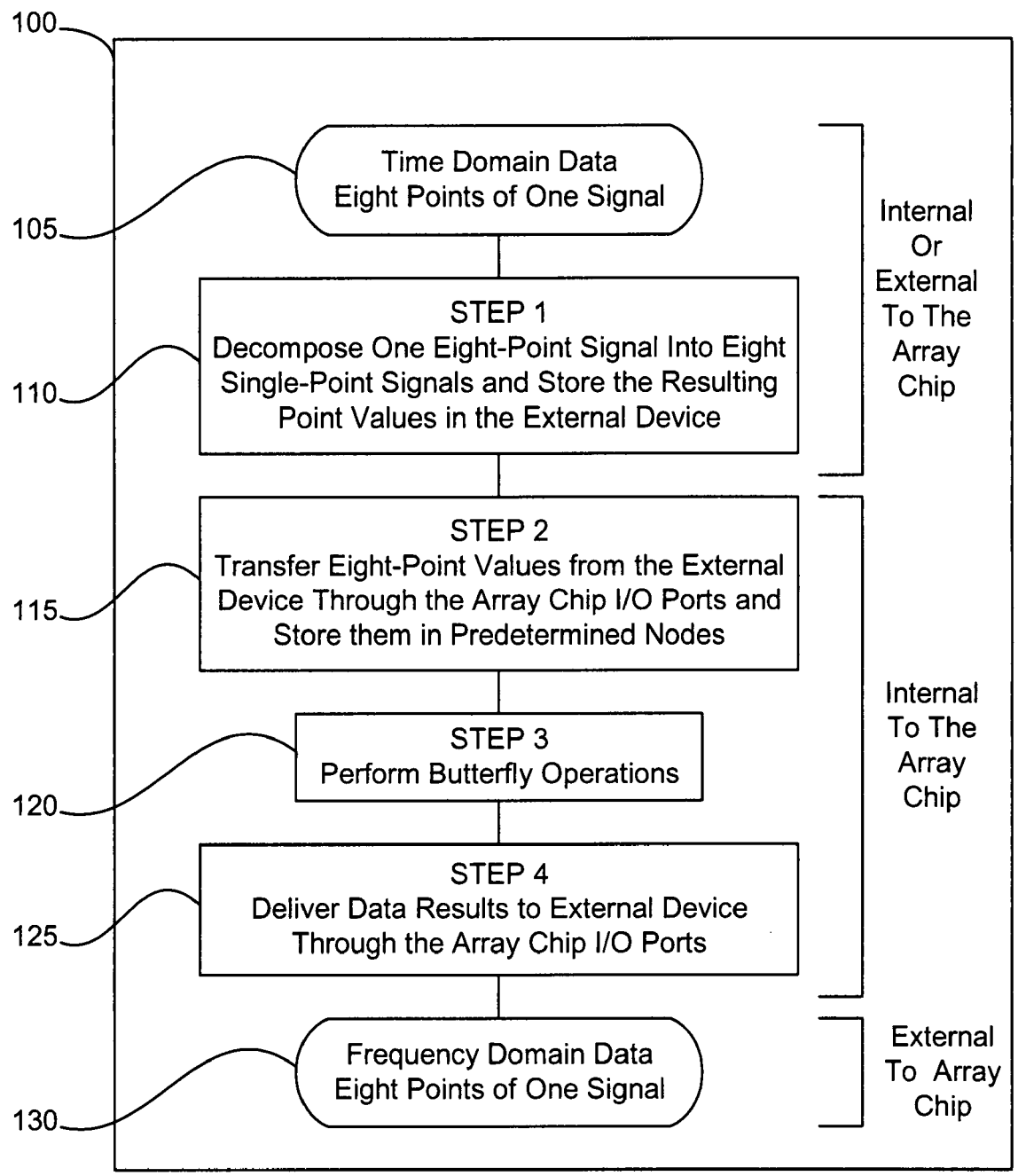
FIG. 2 is a flow diagram of the multicore FFT process according to the invention.

FIG. 2 illustrates, in high level flow diagram form, the multicore FFT process according to the invention, designated therein by the general reference character 100. The process 100 can be used for transforming time domain data 105 into frequency domain data 130. Alternatively, the process 100 can also be used to transform frequency domain data back into time domain data. The data 105 contains one signal made up of N complex numbers (also referred to as "points"). Each of these complex points is composed of two numbers, the real part and the imaginary part. In the description that follows herein, the singular term "point" refers to the combination of the real part and the imaginary part. A set of N points can be used to represent the magnitude and frequency of a periodic signal, sampled sequentially at a given rate, where N equals any positive integer of value one or greater. The set of points may be held in computer memory or a register stack. The number of points is predetermined according to the application. In the example shown, there are eight points of signal data. Process 100 comprises four main steps, which are described as follows:

In step 110, which can be done external to the array chip, the time domain data 105 are rearranged, with reference to the sequence index of each point, into a decomposed FFT signal pattern. In the present example, referring to the sequence indices, the original data sequence 0 1 2 3 4 5 6 7 is rearranged into a decomposed data sequence 0 4 2 6 1 5 3 7.

In step 115 according to the invention, with reference also to FIG. 1, the decomposed data is received by node 15a (from external device 40 through I/O ports 30) and routed to other nodes of the array, each point to a particular node, according to sequence index of the point, as given in Table 1.

In an alternate embodiment of the invention, step 110 can be omitted and the data 105 can be directly received by node 15a in original sequence and routed to other nodes, each point to a particular node according to the sequence index of the point as given in Table 1.

Step 120 performs all of the butterfly computations. Step 125 moves the eight resulting points back to the external device 40 through I/O port 30. The external device 40 now contains eight points of frequency domain data 130 corresponding to the time domain data 105.

TABLE 1

| NODE REFERENCE | POINT INDEX |
|---|---|
| 15c | 0 |
| 15d | 4 |
| 15e | 2 |
| 15f | 6 |
| 15g | 1 |
| 15h | 5 |
| 15i | 3 |
| 15j | 7 |

The steps 115, 120, and 125 of the present inventive method will now be described in further detail. In particular, the eight input points are initially stored in specific nodes as shown in Table 1. This mapping provides an optimum physical placement of the initial point data to be calculated in the first stage of the butterfly computations 120.

Figure 3:
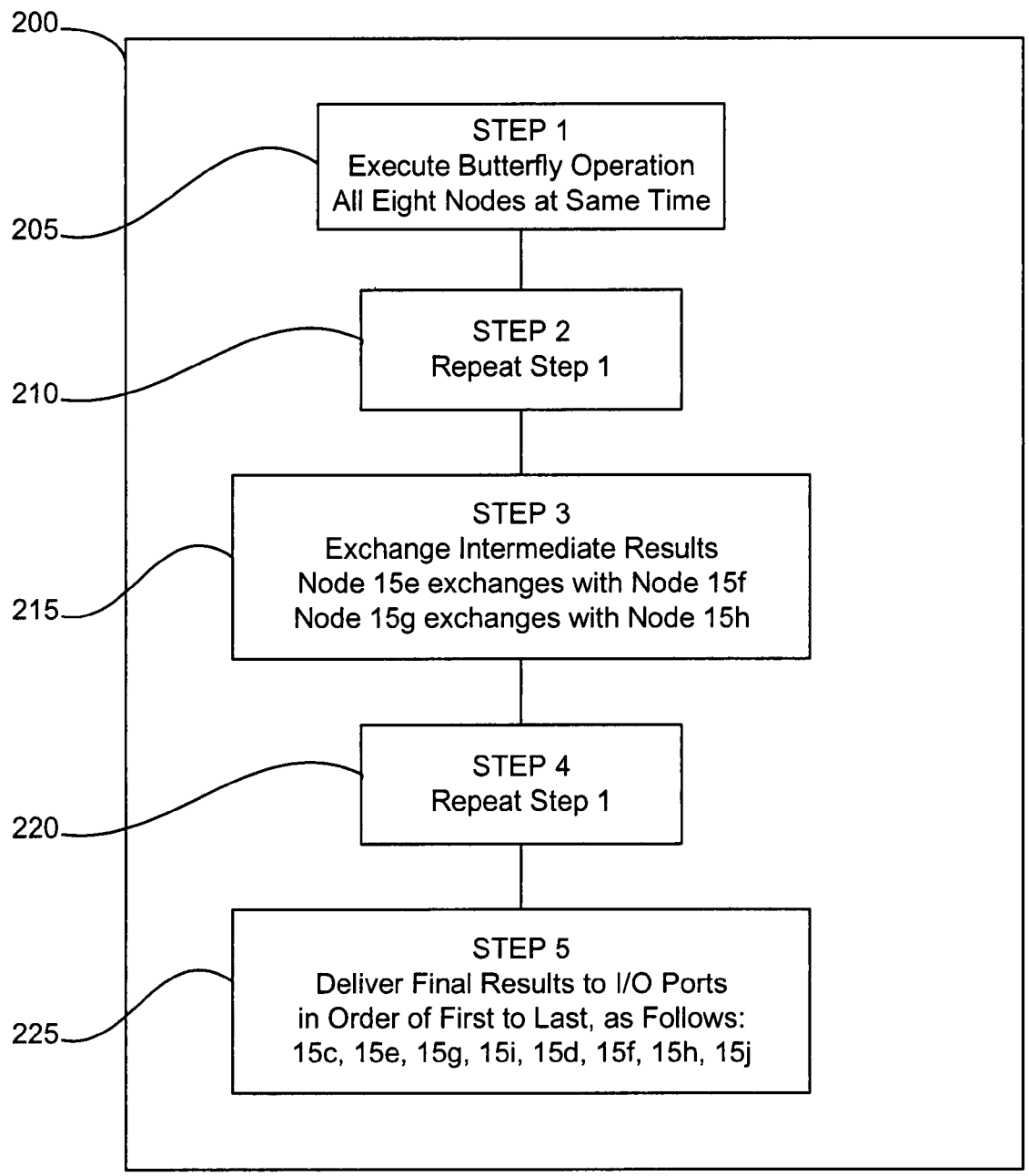
FIG. 3 is a flow diagram of a portion of the multicore FFT process in greater detail.

FIG. 3 is a flow diagram view of the internal sub-steps 200 of step 120 of FIG. 2. As known in the art, butterfly computations execute with pairs of data points, corresponding here to pairs of nodes. In the example shown, with reference to FIG. 1, node 15c is paired with node 15d, 15e is paired with 15f, 15g is paired with 15h, and 15i is paired with 15j. This paring remains the same throughout the computations in step 205, and after the control and data exchange step 215, regardless of the current data points stored in each node. The present inventive method defines the most optimum pairing to achieve the fastest execution time, by assuring that paired node assignments are as physically close to each other as possible, even after data and control exchanges occur between any nodes. The present inventive method also determines the closest sets of pairs that will exchange intermediate computational results 215.

Sub-step 205 executes a butterfly computation in all pairs of nodes essentially simultaneously, using the data points stored in the nodes in step 115.

Sub-step 210 simply repeats sub-step 205. Sub-step 215 exchanges the intermediate results from the first two steps, between two sets of nodes as follows: 15e exchanges with 15f, and 15g exchanges with 15h. The data and control transfer operations execute in the shortest possible time, because the transfers occur between the physically closest neighboring nodes.

Sub-step 220 simply repeats sub-step 205, again. Sub-step 225 delivers the final results sequentially to the array I/O ports 30, in a particular node order as follows: (15c, 15e, 15g, 15i, 15d, 15f, 15h, 15j). These point data are delivered in sequence, passing through node 15b, node 15a, I/O ports 30, and are subsequently transferred to an external device 40.

While a specific multicore method for an eight point FFT computation has been discussed herein, it will be apparent to those familiar with the art that the same method can be extended to transform input data (time domain data) comprising more than eight points. The method is not limited to implementation on one multiple core processor array chip, and with appropriate circuit and software changes, it may be extended to utilize, for example, a multiplicity of processor arrays. It is expected that there will be a great many applications for this method which have not yet been envisioned. Indeed, it is one of the advantages of the present invention that the inventive method may be adapted to a great variety of uses.

The multicore FFT method discussed above is only one example of available embodiments of the present invention. Those skilled in the art will readily observe that numerous other modifications and alterations may be made without departing from the spirit and scope of the invention. Accordingly, the disclosure herein is not intended as limiting and the appended claims are to be interpreted as encompassing the entire scope of the invention.

INDUSTRIAL APPLICABILITY

The inventive computer logic array 10, instruction set and method are intended to be widely used in a great variety of computer applications. It is expected that they will be particularly useful in applications where significant computing power and speed is required.

As discussed previously herein, the applicability of the present invention is such that the inputting information and instructions are greatly enhanced, both in speed and versatility. Also, communications between a computer array and other devices are enhanced according to the described method and means. Since the inventive computer logic array 10, and method of the present invention may be readily produced and integrated with existing tasks, I/O devices and the like, and since the advantages as described herein are provided, it is expected that they will be readily accepted in the industry. For these and other reasons, it is expected that the utility and industrial applicability of the invention will be both significant in scope and long-lasting in duration.

The invention claimed is:

1. A method of mapping complex computations on complex data to multiple computer nodes to achieve higher execution speed, comprising the steps of: dividing said complex data into subsets of data, directing a subset of data to a node, and, routing each subset of data to other individual nodes and processing each subset of data in the node said subset was directed to, collecting the result of each calculation and transferring said collected results to an output.

2. A method of mapping complex computations on complex data to multiple computer nodes to achieve higher execution speed as in claim 1, wherein said complex calculations are butterfly calculations.

3. A method of mapping complex computations on complex data to multiple computer nodes to achieve higher execution speed as in claim 2, wherein said dividing step divides the data into subsets determined the time domain data are rearranged, with reference to the sequence index of each point, into a decomposed FFT signal pattern.

4. A method of mapping complex computations to multiple computers to achieve higher execution speed as in claim 1, further comprising the step of rearranging the time domain data.

5. A method of mapping complex computations on complex data to multiple computer nodes to achieve higher execution speed as in claim 4, wherein said rearrangement step is accomplished in an external device.

6. A method of mapping complex computations to multiple computers to achieve higher execution speed as in claim 4, further comprising the step of exchanging the intermediate results from the first two steps, between two sets of nodes.

7. A method of mapping complex computations to multiple computers to achieve higher execution speed as in claim 6, wherein said nodes are selected to be in close physical proximity to minimize data transfer time between nodes.

8. A system for performing complex mathematical calculations comprising, an input, and an output, a plurality of microprocessors on a substrate wherein each microprocessor includes its own ROM and RAM and is connected directly to at least two other microprocessors by a data path, and an instruction set for conveying data to individual microprocessors, and routing each subset of data to other individual microprocessors, and processing each subset of data in the microprocessor said subset was directed to, and collecting the result of each calculation and transferring said collected results to said output.

9. A system for performing complex mathematical calculations as in claim 8, wherein said complex calculations are butterfly calculations.

10. A system for performing complex mathematical calculations as in claim 9, wherein said instruction set conveys data to processors in close proximity to each other for minimizing calculation time.

11. A system for performing complex mathematical calculations as in claim 8, wherein at least two of those cores on the periphery of said chip are devoted to I/O functions.

12. A system for performing complex mathematical calculations as in claim 11, wherein said complex calculations are performed by those cores in the center of said chip.

13. A system for performing complex mathematical calculations as in claim 12, wherein said complex calculations are performed by multiple cores in the center of said chip, and wherein the time domain data is rearranged, with reference to the sequence index of each point, into a decomposed FFT signal pattern.

14. A system for performing complex mathematical calculations as in claim 13, wherein the central cores calculating the time domain data with reference to the sequence index of each point, into a decomposed FFT signal pattern are selected to be in close physical proximity.

15. A set of instructions for use in a processor array having a plurality of microprocessors mapping complex computations on complex data, comprising: instructions for dividing said complex data into subsets of data, and directing a subset of data to a node, and routing each subset of data to other individual nodes, and processing each subset of data in the node said subset was directed to, collecting the result of each calculation and transferring said collected results to an output.

16. A set of instructions for use in a processor array having a plurality of microprocessors mapping complex computations on complex data as in claim 15, wherein said complex calculations are butterfly calculations.

17. A set of instructions for use in a processor array having a plurality of microprocessors mapping complex computations on complex data as in claim 16, wherein said dividing step divides the data into subsets, the time domain data are rearranged, with reference to the sequence index of each point, into a decomposed FFT signal pattern.

18. A set of instructions for use in a processor array having a plurality of microprocessors mapping complex computations on complex data as in claim 15, further comprising the operation of rearranging the time domain data.

19. A set of instructions for use in a processor array having a plurality of microprocessors mapping complex computations on complex data as in claim 18, wherein said rearrangement operation is accomplished in an external device.

20. A set of instructions for use in a processor array having a plurality of microprocessors mapping complex computations on complex data as in claim 18, further comprising the operation of exchanging the intermediate results from between two sets of nodes.

21. A set of instructions for use in a processor array having a plurality of microprocessors mapping complex computations on complex data as in claim 20, wherein said nodes are selected to be in close physical proximity to minimize data transfer time between nodes.

* * * * *